United States Patent [19]

Nishigai et al.

[11] Patent Number: 4,914,635

[45] Date of Patent: Apr. 3, 1990

[54] APPARATUS FOR KNEADING RUBBER-LIKE MATERIAL

[75] Inventors: Kazuhisa Nishigai; Juumei Harada, both of Tokyo, Japan

[73] Assignee: Bridgestone Corporation, Tokyo, Japan

[21] Appl. No.: 195,756

[22] Filed: May 19, 1988

[30] Foreign Application Priority Data

May 19, 1987 [JP] Japan ................................ 62-121653

[51] Int. Cl.$^4$ ............................. B01F 7/08; B29B 7/20
[52] U.S. Cl. ...................................... 366/97; 366/300
[58] Field of Search ...................... 366/69, 96, 97, 75, 366/76, 77, 85, 84, 100, 297, 298, 300, 301; 425/201, 204, 207, 208, 209

[56] References Cited

U.S. PATENT DOCUMENTS

| | | | |
|---|---|---|---|
| 1,260,684 | 3/1918 | Kempter | 366/300 |
| 1,371,046 | 3/1921 | Mosher | 366/100 X |
| 2,504,337 | 4/1950 | Loomis | 366/97 X |
| 2,559,418 | 7/1951 | Ford | 366/301 X |
| 2,611,590 | 9/1952 | Jebens | 366/301 X |
| 3,239,878 | 3/1966 | Ahlefeld, Jr. et al. | 366/77 |
| 3,565,403 | 2/1971 | Matsuoka | 366/84 |
| 4,234,259 | 11/1980 | Wiedmann et al. | 366/81 |
| 4,332,481 | 6/1982 | Inoue et al. | 366/84 |
| 4,380,397 | 4/1983 | Hashizume et al. | 366/77 |
| 4,456,381 | 6/1984 | Inoue et al. | 366/97 |

FOREIGN PATENT DOCUMENTS

| | | |
|---|---|---|
| 553836 | 1/1980 | Japan . |
| 553837 | 1/1980 | Japan . |
| 553838 | 1/1980 | Japan . |
| 55-152535 | 11/1980 | Japan . |
| 63-47107 | 2/1988 | Japan . |
| 376184 | 7/1932 | United Kingdom ................. 366/96 |

OTHER PUBLICATIONS

"Latest Rubber Processing Machine"; Katsunobu Hagiwara; reported in Autumn Seminar of Japan Rubber Association Kansai District—and translation thereof, 1986, (month unknown).

Primary Examiner—Harvey C. Hornsby
Assistant Examiner—Scott J. Haugland
Attorney, Agent, or Firm—Sughrue, Mion, Zinn, Macpeak & Seas

[57] ABSTRACT

A kneading apparatus for an elastomer has a casing with a pair of rotors mounted therein. The casing defines a rotor chamber having an co-coon shaped cross-section. The pair of rotors are rotatably disposed in the rotor chamber, and extend in parallel with each other. Each of the rotors is integrally provided with at least two continuous blades, the rotating blades define a space therebetween in which rubber-like material is introduced for kneading. Each of the blades is continuously provided along a length of the rotor, and each of the blades includes a first blade portion oriented in a first direction at axially one end portion of the rotor, and a second blade portion oriented in a second direction. The first blade portion is provided at rotationally advanced position, and the second blade portion is provided at rotationally rear position. A radial clearance portion between the inner surface of the rotor chamber and the end face of the second blade portion is larger than a radial clearance portion defined between the inner surface and the end face of the first blade portion.

8 Claims, 7 Drawing Sheets

APPARATUS FOR KNEADING RUBBER-LIKE MATERIAL

The present invention relates to an apparatus for kneading generally referred to as a "Banbury mixer", that is pulverizing and mixing, rubber-like material, and more particularly, to such kneading apparatus in which rubberlike substance is subjected to kneading by a rotation of a rotor in co-coon shaped casing.

Figure 8A:
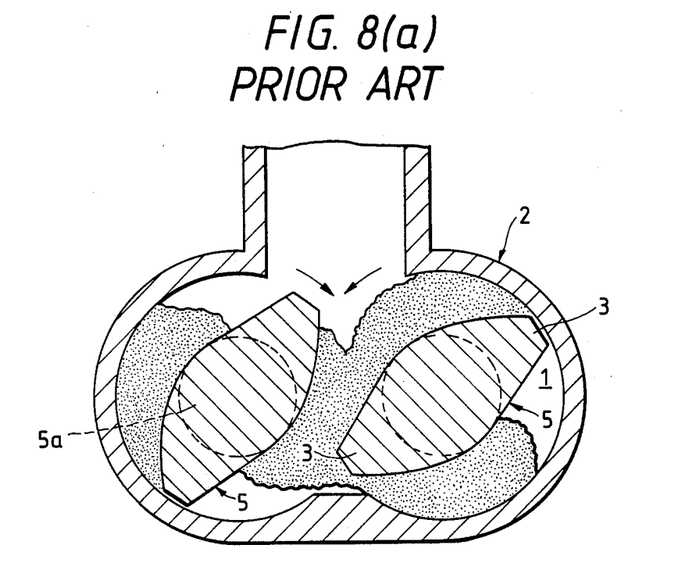
FIG. 8(a) is a schematic cross-sectional view showing a conventional kneading apparatus.
Figure 8B:
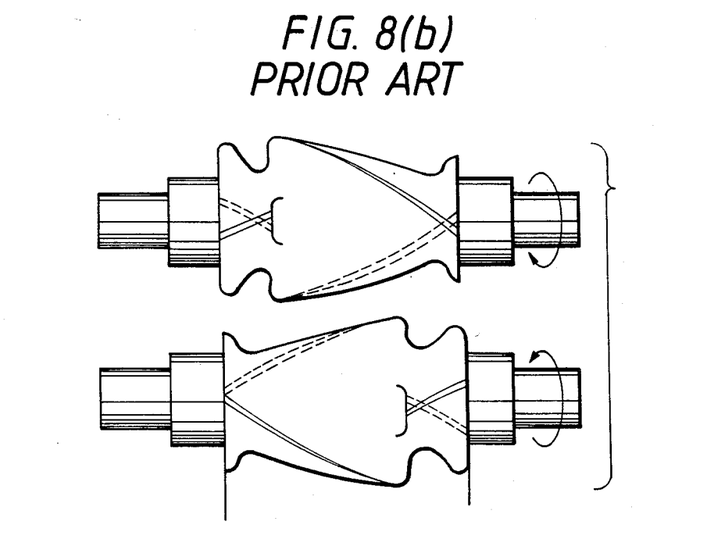
FIG. 8(b) is a plane view showing rotors of the conventional kneading apparatus.
Figure 9:
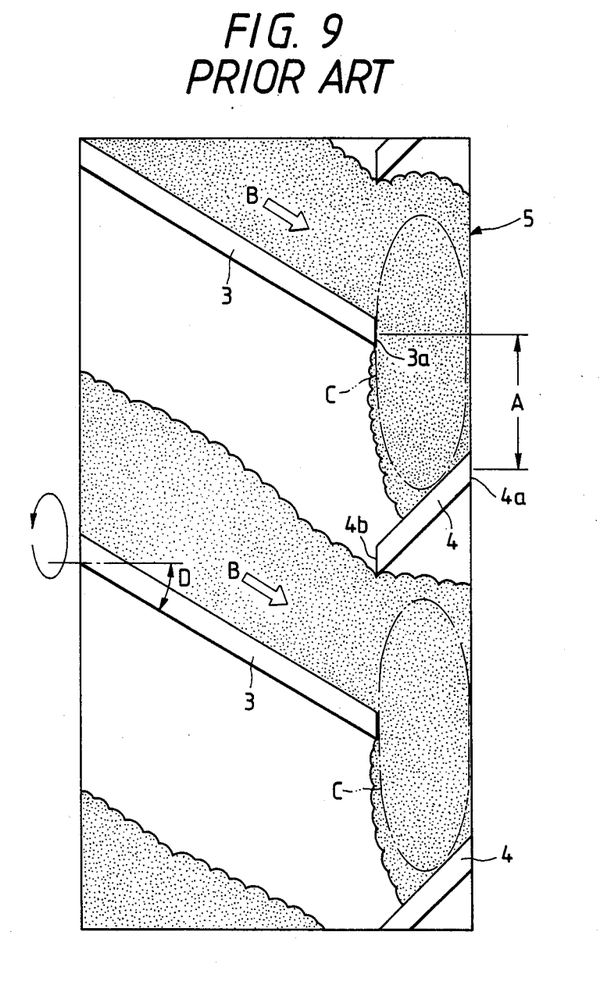
FIG. 9 is an exploded view showing the rotor in the conventional kneading apparatus.

A conventional kneading apparatus for blending or kneading rubber material with chemicals is shown in FIGS. 8(a), 8(b) and FIG. 9. In this conventional rubber kneading apparatus, a casing 2 defines a chamber 1 having an co-coon shaped cross-section, and a pair of rotors 5 is provided with two major wings 3 or blades 3 disposed at diametrically opposite sides of a rotor shaft 5a, and two minor wings or blades 4 are disposed at diametrically opposite sides thereof. These wings are spirally disposed over the rotor shaft 5a. The major wings 3 are positioned at the axially front side of the rotor shaft 5a. The minor wings 4 are positioned at the axially rear side of the rotor shaft. Tail end portions 3a of the major wings and leading end portions 4b of the minor wings 4 are alternately arranged as shown in FIG. 9 in a circumferential direction of the rotor shaft 5a. The major and minor wings are directed toward the rotationally retarding side of the rotor shaft 5a in a direction toward the axially center portion of the rotor shaft 5a. That is, leading ends 3b of the major wings 3 are at angularly advanced positions with respect to the trailing ends 3a in a rotational direction of the rotor shaft 5a, whereas, leading ends 4b of the minor wings 4 are at angularly backward positions with respect to the trailing ends thereof. The rotors 5 are rotated in directions opposite to each other. As a result, rubber and chemicals input to chamber 1 are subjected to kneading.

With the conventional arrangement described above, only a small circumferential distance A (FIG. 9) is provided between the rotationally back side 3a of the major wing 3 and the rotationally front side 4a of the minor wing 4. Further, as illustrated in FIG. 9, blended rubber flowing along the major wings 3 in a direction shown by an arrow B is oriented in a direction approximately perpendicular to the flowing direction at the rotationally back end 3a of the major wings 3. Due to this abrupt direction change of the flowing direction, the kneading rubber does not consistently pass through space (region C) defined between the major and minor wings, so that the rubber flow may be blocked by the minor wings 4. Accordingly, the rubber tends to remain at the region C for a long period of time, to thereby degrade dispersing property of the chemicals such as a carbon.

In order to avoid such problems, it is conceivable to increase the circumferential distance A. However, in order to realize this change, wing numbers must be reduced, which in turn leads to lowering of the productivity. Therefore, such a proposal cannot be employed for practical production.

Further, in order to enhance productivity of rubber-kneading, a torsion angle D is required to be increased and thus the filling rate of the rubber with respect to the internal volume of the chamber 1 is required to be increased. However, such an increase provides excessive degradation of the dispersing characteristic of the chemicals relative to the rubber.

In another aspect, according to the conventional kneading apparatus, the major wing 3 terminates at the rotationally back side 3a, and the minor wing 4 terminates at the rotationally back side 4b. Therefore, the section modulus of the wings are abruptly changed at the end portions 3a, 4b, so that stress concentrations occur there at. Accordingly, in the case of producing relatively rigid rubber, cracks may be generated at radially inward portions of these wings (root portions of these wings) in the rotationally backward end portions 3a, 4bthereof.

SUMMARY OF THE INVENTION

It is therefore an object of the present invention to overcome the above described conventional drawbacks and disadvantages, and to provide an improved kneading apparatus.

Another object of this invention is to provide such improved kneading apparatus which prevents rubber from clogging the device and provides efficient dispersion of the chemicals into the rubber.

Still another object of this invention is to provide such apparatus capable of eliminating local abrupt change in section modulus of the wings to thereby avoid stress concentrations at the local area of the wings.

Still another object of this invention is to provide such apparatus available for kneading rigid rubber material yet minimizing crack generation at the wings.

These and other objects of this invention will be attained by providing a kneading apparatus which includes a casing and a pair of rotors provided with novel blades. The casing defines a rotor chamber having an co-coon shaped cross-section. The pair of rotors are rotatably disposed in the rotor chamber, and extend in parallel with each other. Each of the rotors is integrally provided with at least two continuous blades. The rotors are rotated in directions opposite to each other, so that the rubber-like material is kneaded. Each of the blades is continuously provided along a length of the rotor, and each of the blades includes a first blade portion oriented in a first direction at axially one end portion of the rotor, and a second blade portion oriented in a second direction. The first blade portion is provided at a rotationally advanced position, and the second blade portion is provided at a rotationally rear position.

A "radial clearance" is defined as the distance between an inner surface of the rotor chamber and radially outer end face of the blade. A "radial clearance portion" is defined as the distance between the inner surface of the rotor chamber and the end face of the second blade portion that is larger than a radial clearance portion defined between the inner surface and the end face of the first blade portion.

When the rubber-like material input to the rotor chamber is moved along the rotating blades toward the rotationally retard side thereof, rubber clogging will not occur at the rotationally retard side, since the radial clearance at this portion is larger than the radial clearance at the rotationally advanced side. When the rubber-like material passes through the large clearance, the rubber-like material is subjected to a shearing force, so that sufficient rubber kneading is attainable and the chemicals is uniformly dispersed at a high rate into the rubber-like material. Further, since the rotor blades are continuously provided along the length of the rotor, there is no local portion at which the section modulus is abruptly changed. As a result, no stress concentration occurs. Therefore, the rotor blade is free from crack generation at the radially inner portion thereof even if relatively rigid rubber-like material is subjected to kneading.

DETAILED DESCRIPTION OF THE PREFERRED EMBODIMENTS

A first embodiment according to this invention will be described with reference to FIGS. 1 through 3.

A kneading apparatus 11 is generally referred to as a "Banbury mixer" having a casing 13 in which a chamber 12 having an co-coon shape in cross-section is defined. In the chamber 12, a pair of rotors 14 and 15 are juxtaposed with each other in horizontal direction, which are rotatably supported by the casing 13. Each of the rotors 14 and 15 includes a rotor shaft 16, and two continuous blades 17 protruding in approximately radial direction of the rotor shaft 16 and are integral therewith.

Two blades 17 continuously extend along the length of the shaft 16. That is, blades 17 continuously extend from one end to another end without any discontinuous portion. Further, each blade 17 is gradually spirally provided over the rotor shaft so that one end portion of the blade is positioned at rotationally advanced angular position while the other end portion of the blade is positioned at rotationally backward angular position thereof in circumferential direction of the rotor shaft 16. At the other end portion of the continuous blade 17, that is, at the rotationally backward portion thereof, a parallel portion 18 (FIG. 2) is provided which extends in parallel in the axial direction of the rotor shaft 16.

The parallel portion 18 provides a zero intersection angle F (torsion angle) defined between the blade and a plane E which contains a rotation axis of the rotor. Furthermore, a clearance G (FIG. 3) defined between an internal surface 20 of the chamber and a radially outer end face 19 at the parallel portion 18 is larger than a clearance H defined between the internal surface 20 and radially outer end face 21 at the rotationally advanced portion (one end portion) of the blade 17.

The operation according to the first embodiment will next be described.

The rotors 14 and 15 connected to a motor (not shown) are rotated in directions opposite to each other. The chamber 12 is charged with a mixture of rubber, carbon and chemicals and the mixture is supplied into the space defined between the rotating blades for kneading.

Figure 6:
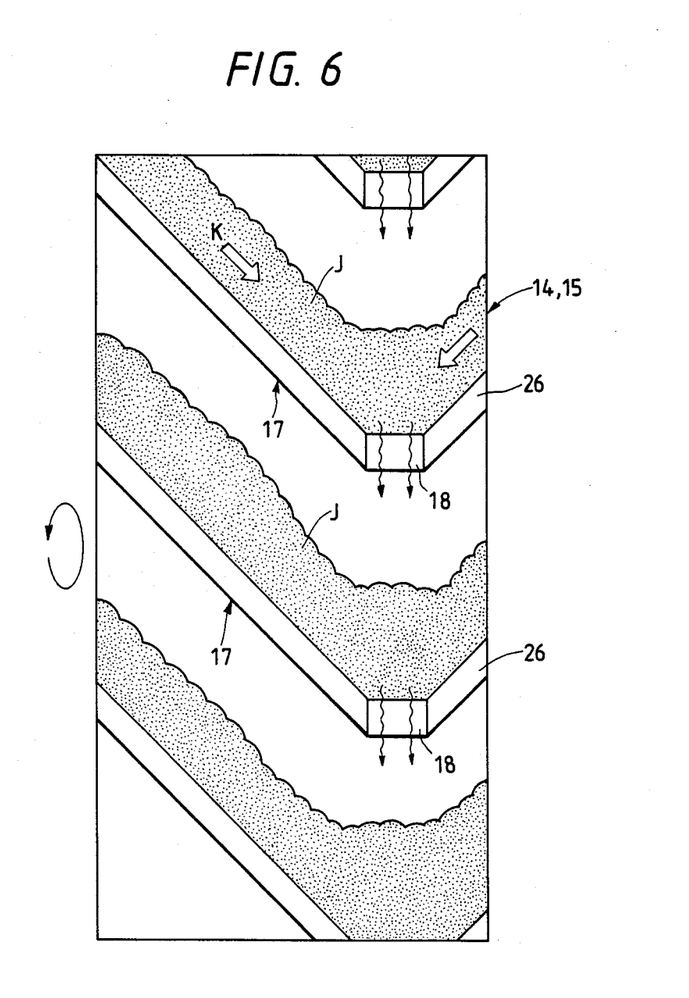
FIG. 6 is an enlarged diagram showing a rotor of a kneading device according to a second embodiment of this invention.

In this case, since each of the continuous blades 17 are obliquely directed maintaining intersecting angle F with respect to the plane E, rubber mixture J positioned at immediately upstream side of the blades 17 flows along the blades 17 in a direction shown by an arrow K toward the other end portion thereof. By movement of the rubber mixture J, the rotors 14 and 15 are subjected to thrusting force orienting toward the other end portion thereof. However, this thrusting force can be moderated because of the parallel portions 18. In order to further reduce the thrusting force, sealing can be provided at both ends of the rotors 14 and 15. Alternatively, as shown in FIG. 6, at the other endmost portion, inclined portions 26 directed in a direction opposite the blades 17 which are positioned at one end portion of the rotor. The modification will be described herein in detail as a second embodiment.

By the above-described movement of the rubber mixture, the mixture J is gathered at an immediately upstream side of the parallel portions 18, where there is provided the large clearance G between the inner surface of the chamber wall 20 and the radially outer end face 19 of the parallel portion 18. The clearance G is larger than the clearance H. Therefore, rubber mixture J passes from the blade 17 to the parallel blades 18 because of the larger clearance G. As a result, the rubber mixture does not remain at the portion immediately upstream side of the parallel portion 18, and passes through the continuous blade. In this case, rubber is subjected to a large shearing force, so that excellent rubber kneading is attainable, to thereby obtain sufficient dispersion of the chemicals such as a carbon into the rubber.

Further, since blades 17 continuously extend from one end to the other end of the rotor, there is no local portion where section modulus is abruptly changed. Accordingly, stress concentration does not occur. As a result, no cracks are formed at the radially inner portion of the continuous blade 17 even for the kneading of the relatively rigid rubber-like material J.

Figure 4:
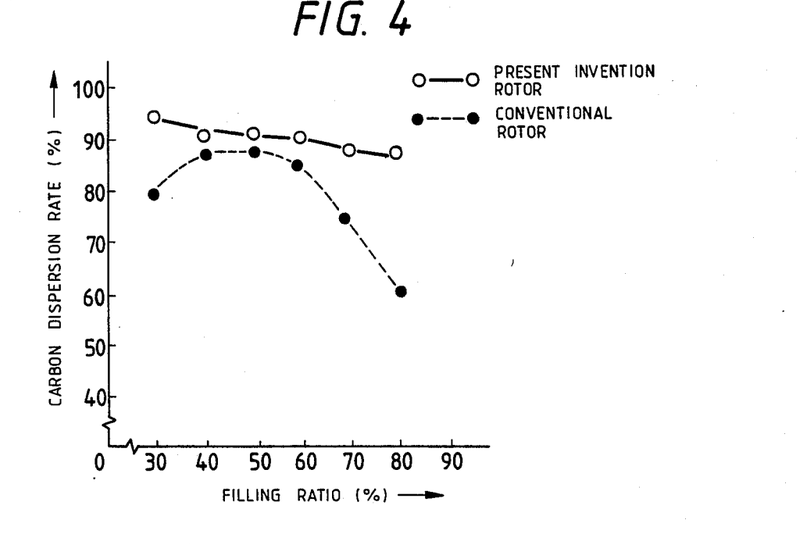
FIG. 4 is a graphical representation showing carbon dispersion characteristics for a purpose of comparison between a conventional kneading apparatus and the kneading apparatus of this invention.
Figure 5:
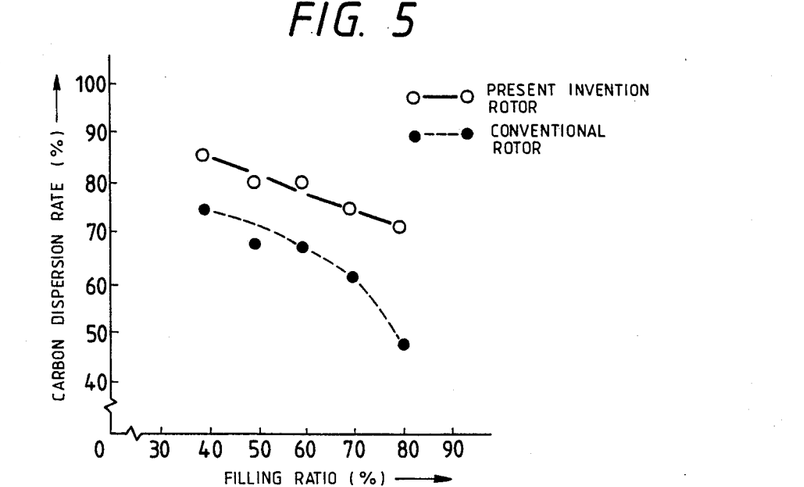
FIG. 5 is a graph showing the carbon dispersion characteristic yet changing the mixing ratios different from those in the experiments shown in Fig. 4.

FIGS. 4 and 5 illustrate experimental results of the carbon dispersion rate using the rotor as shown in FIG. 6 of the present invention and a conventional rotor having four pieced blades, after rubberized material is kneaded for a predetermined period. The mixing ratio of carbon and chemicals in the experiment in FIG. 4 is different from that in FIG. 5. Data attendant to the conventional apparatus and this invention are plotted in black marks and white marks, respectively.

The experiments for a rotor of the present invention were conducted under the conditions as follows; the intersection angle F was at 45 degrees, the clearance G was 40 mm, the clearance H was 15 mm and the axial length of the parallel portion of the blade was 3/10 of the axial length of the whole blade.

From these data, the carbon dispersion rate in the present invention was higher than that in the conventional apparatus. Therefore, carbon was more uniformly dispersed, and an improved dispersion rate was obtainable in the present invention. Further, according to the conventional apparatus, carbon dispersion was immediately lowered in accordance with increase in filling ratio. On the other hand, in the present invention, the carbon dispersion rate was only slightly lowered in accordance with the increase of the filling ratio, and high carbon dispersion was still obtainable.

Figure 1:
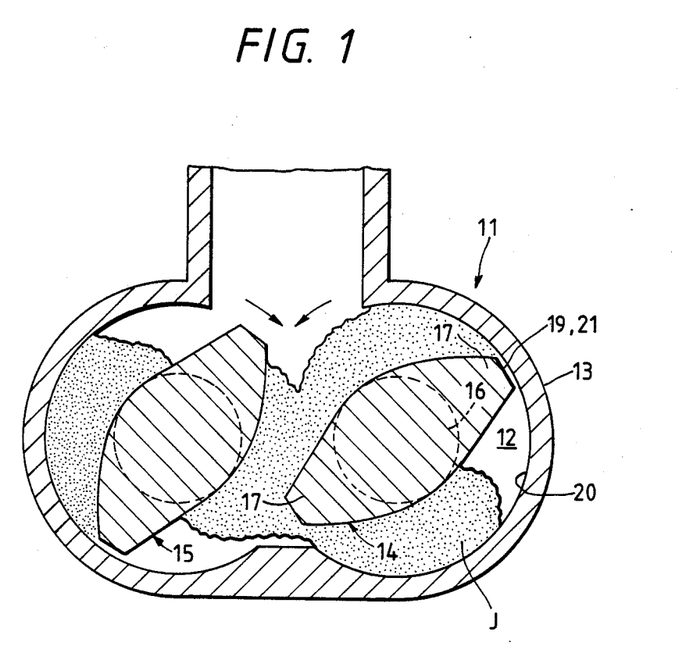
FIG. 1 is a schematic cross-sectional view showing a kneading apparatus according to a first embodiment of this invention.
Figure 2:
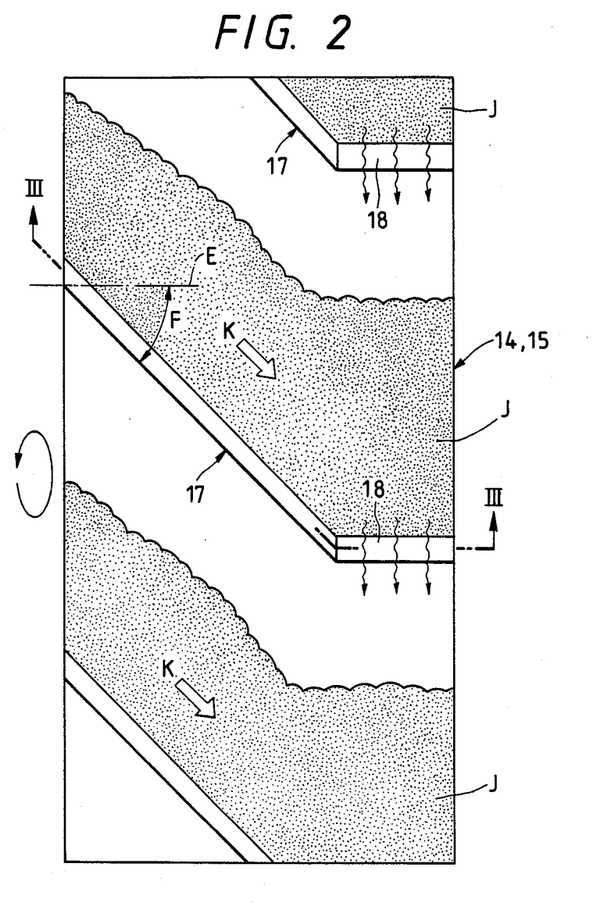
FIG. 2 is an exploded diagram showing a rotor of the kneading apparatus in FIG. 1.
Figure 3:
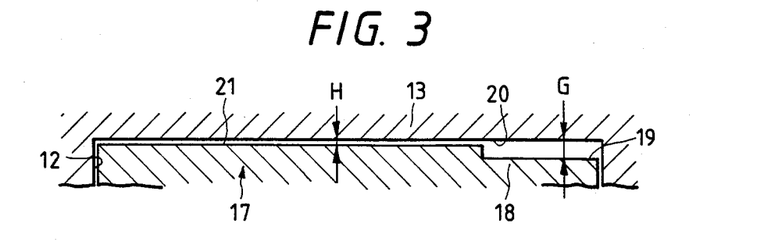
FIG. 3 is a cross-sectional view taken along the line III—III of FIG. 2.

A second embodiment of this invention is illustrated in FIG. 6, wherein like parts and components are designated by the same reference numerals and characters as those shown in the first embodiment shown in FIGS. 1 through 3. In the second embodiment, each of the continuous blades is bent, so that there are first inclined portion positioned at one end portion of the rotor, an intermediate parallel portion 18, and a second inclined portion 26 directed in a direction opposite the first inclined portion relative to a circumferential direction of the rotor shaft at the other end portion. The clearance between the peripheral surface 20 of the chamber is the largest at the intermediate parallel portion 18.

Figure 7:
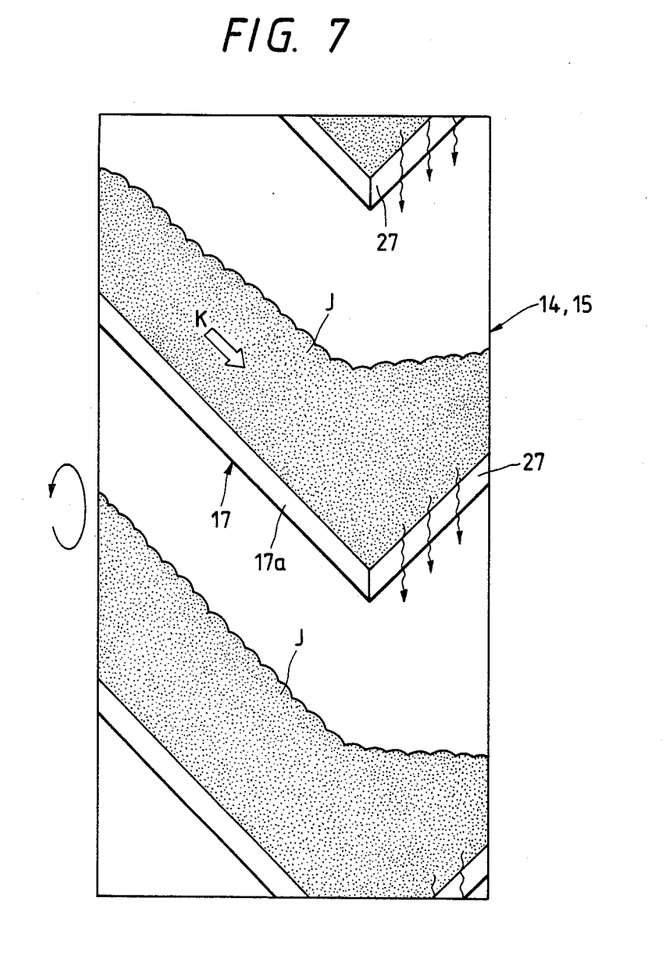
FIG. 7 is an enlarged diagram showing a rotor of a kneading device according to a thrd embodiment of this invention.

A third embodiment is shown in FIG. 7. In the third embodiment, no parallel portion is provided. Instead, two inclined blade portions 17a and 27 directing in are oriented opposite to each other in circumferential direction of the rotor shaft. The clearance defined between the inner surface of the rotor chamber and radially outer end face of the second blade portion 27 is larger than that defined between the inner surface 20 and radially outer end face of the first blade portion 17a.

In view of the foregoing, according to the present invention, rubberized material is sufficiently kneaded, and the chemicals is efficiently dispersed. Further, the crack generation at the radially inner portion of the blades is eliminated. It is apparent that other modifications of this invention may be practiced without departing from the scope of this invention.

What is claimed:

1. An apparatus for kneading rubber-like material comprising:
    a casing defining a rotor chamber having a co-coon shaped cross-section, said rotor chamber providing an inner surface;
    a pair of confronting rotors rotatably mounted in said chamber, said pair of rotors being juxtaposed with each other, and each of said rotors integrally provided with at least two blades; said blades in one of said rotors being spacedly engaged with said blades in the other rotor, and said rubber-like material being subjected to kneading at a space defined between said confronting rotors, each of said blades continuously provided along a length of said rotor, each of said blades comprising a first blade portion oriented in a first direction at one end portion of said rotor, and a second blade portion oriented in a second direction and contiguous with said first portion, said first portion being provided at rotationally advanced position, and said second portion being provided at rotationally retarded position in circumferential direction of said rotor; and
    said inner surface of said rotor chamber and a radially outer end face of said second blade portion defining a clearance which is larger than a clearance defined as between said inner surface and a radially outer end face of said first blade portion.

2. The apparatus as defined in claim 1, wherein said rotor includes a rotor shaft, and said second blade portion extends in a direction parallel with an axis of said rotor shaft.

3. The apparatus as defined in claim 2, wherein said second blade portion is provided at an axially intermediary portion of said rotor and in a direction parallel with an axis of said rotor shaft, each of said blades further comprising a third blade portion at the other end portion of said rotor, said first and third blade portions oriented in directions opposite each other.

4. The apparatus as defined in claim 1, wherein said second blade portion is oriented in a direction opposite to said first blade portion.

5. An apparatus for kneading an elastomer comprising:
    a casing defining a rotor chamber having an inner surface;
    a pair of rotors mounted for rotation in a juxtaposed relationship, each of said rotors having at least two blades provided continuously along said rotor;
    each of said blades having at least first and second blade portions, said first blade portion oriented in a first direction at one end of said rotor and said second blade portion contiguous with said first blade portion and oriented in a second direction; and
    said inner surface of said rotor chamber and radially outer end face of said second blade portion defining a clearance which is larger than a clearance between said inner surface and a radially outer end face of said first blade portion.

6. The apparatus as defined in claim 5, wherein said rotor includes a rotor shaft, and said second blade portion extends in a direction parallel with an axis of said rotor shaft.

7. The apparatus as defined in claim 5, wherein said second blade portion is provided at an axially intermediate portion of said rotor and in a direction in parallel with an axis of said rotor shaft, each said blade further comprising a third blade at another end portion of said rotor, said first and third blade portions oriented in directions opposite each other.

8. The apparatus as defined in claim 5, wherein said second blade portion is oriented in a direction opposite to said first blade portion.

* * * * *